H. B. COCKRELL & H. B. MILLER.
HAND HOLE SCRAPER.
APPLICATION FILED NOV. 26, 1909.
963,421.
Patented July 5, 1910.
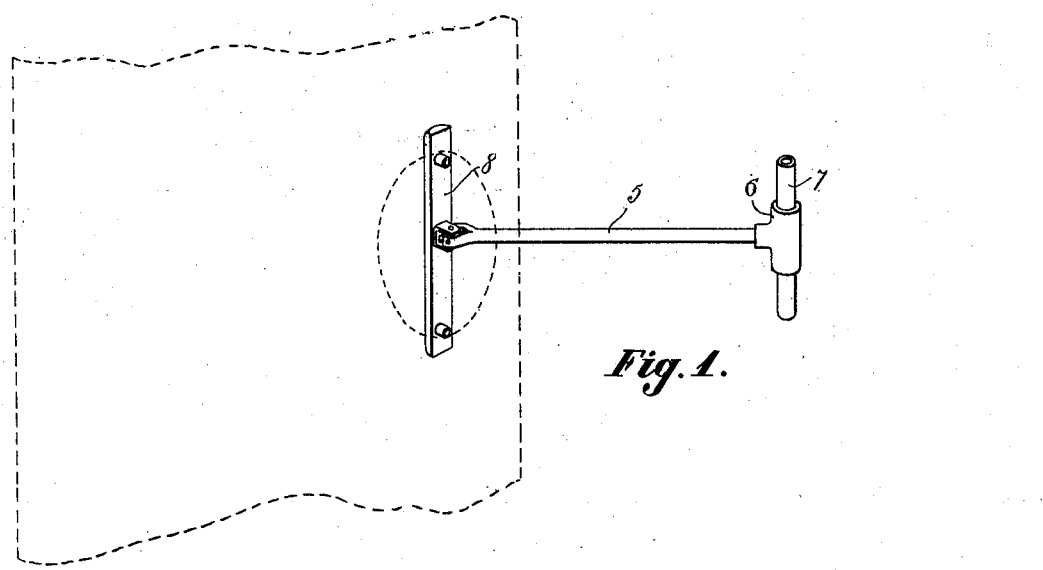
Fig. 1.
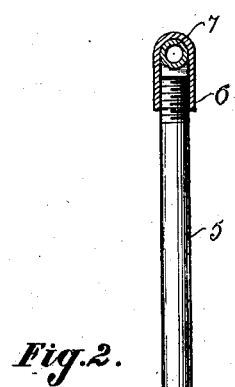
Fig. 3.
Fig. 2.
Witnesses
C. G. Chandler
John A. Donegan
Inventors
Henry B. Cockrell
Heyward B. Miller
By Chandler & Chandler
Attorneys
THE NORRIS PETERS CO., WASHINGTON, D. C.

UNITED STATES PATENT OFFICE.

HENRY B. COCKRELL AND HEYWARD B. MILLER, OF WASHINGTON, DISTRICT OF COLUMBIA.

HAND-HOLE SCRAPER.

963,421.  Specification of Letters Patent.  Patented July 5, 1910.

Application filed November 26, 1909.  Serial No. 529,967.

*To all whom it may concern:*

Be it known that we, HENRY B. COCKRELL and HEYWARD B. MILLER, citizens of the United States, residing at Washington, in the District of Columbia, have invented certain new and useful Improvements in Hand-Hole Scrapers; and we do hereby declare the following to be a full, clear, and exact description of the invention, such as will enable others skilled in the art to which it appertains to make and use the same.

This invention relates to improvements in tools and more particularly to the class known as scrapers.

It is well known when removing the plate from the hand-hole of a boiler that the gasket interposed between the plate and shell of the boiler frequently adheres to the latter.

The present invention has for its principal object the provision of a scraper adapted to be inserted into a hand-hole and caused to bear on the shell of the boiler so as to remove the gasket when the scraper is rotated.

Another object is the provision of a scraper provided with a double cutting edge so that it will perform its scraping function when turned either to the right or left.

A further object is the provision of a scraper provided with a pair of guide rollers adapted to bear on the side of the hand-hole and prevent displacement of the scraper while in operation.

With these and other objects in view as will more fully hereinafter appear, the present invention consists in certain novel details of construction and arrangement of parts, hereinafter fully described, illustrated in the accompanying drawings and more particularly pointed out in the appended claims; it being understood that various changes in the form, proportion, size and minor details of the device may be made without departing from the spirit or sacrificing any of the advantages of the invention.

In the accompanying drawings forming part of the specification:—Figure 1 is a top plan view of a portion of a boiler in dotted lines and showing our improved device in perspective and inserted into the hand-hole of the boiler. Fig. 2 is a sectional end elevation of the device. Fig. 3 is a sectional side elevation of the same.

Similar numerals of reference are employed to designate corresponding parts throughout.

The device comprises a handle, the shank of which is designated by the numeral 5. What will subsequently be termed the outer end of this shank is threaded into a T joint 6, and insertible through the T joint and fixedly secured thereto is a handle grip 7, by means of which the device may be rotated.

The scraper blade is designated by the numeral 8, and is preferably formed of a single piece of metal, oblong in contour and having its opposite longitudinal sides ground so as to provide cutting edges 9 and 10.

Fixedly secured to one face and located at the middle of the scraper blade is a U-shaped yoke, the sides of which are designated by the numerals 11 and 12, and pivoted between the sides 11 and 12, is a block 13. The block 13 is substantially square in contour and is of sufficient size to permit free oscillatory movement of the sides 11 and 12.

By reference now to the drawings it will be seen that the inner end of the shank or that remote from the handle grip 7 is bifurcated, whereby limbs 14 and 15 are provided. These limbs diverge and the space between their inner faces corresponds approximately to the width of the block 13. The limbs 14 and 15 straddle the block 13 and are secured thereto by means of a pivot pin 16, arranged at right angles to the pivotal connection between the block and yoke.

With this construction it is evident that a gimbal joint is provided to connect the handle with the blade and by such provision the blade may be rotated in a plane at right angles to the axis of the hand-hole irrespective of the positon the handle occupies to the axis of the hand-hole. Thus it can be seen when the parts are in position as shown in Fig. 1, and it is impossible for the hand of the operator to be brought into axial alinement with the hand-hole that the blade may be rotated and its cutting edges held in contact with the inner surface of the boiler irrespective of the position of the shank 5.

In order to prevent displacement of the blade during the scraping operation a pair of guide rollers 17 and 18 are provided. These members are mounted on pins 19 and 20, rising from that face of the scraper blade to which the yoke is secured and arranged adjacent the opposite ends of the said blade. The rollers are preferably formed of cylinders of steel and rotate on the pins 19 and 20 and are designed to bear on the side of the hand-hole.

It is manifest with this construction that during the scraping operation and when the rollers bear on the side of the opening that accidental displacement or pulling out of the blade during the scraping operation will be positively prevented by virtue of the roller guides.

From the foregoing it can be seen that we have provided a device which is exceedingly simple in structure and comparatively inexpensive to manufacture, embodying few parts and these so arranged that the danger of derangement will be reduced to a minimum.

What is claimed as new, is:—

1. A hand-hole scraper comprising a substantially rectangular blade formed with cutting edges on its opposite sides in the plane with one face of the blade, and a handle extending from said face intermediate the ends of said blade, said handle being loosely connected to the blade.

2. A hand-hole scraper comprising a substantially rectangular scraper blade formed with cutting edges on its opposite sides in the plane with one face of the blade, a handle extending from the central portion of said face, and a freely movable universal joint connecting the blade and the handle.

3. The herein described hand-hole scraper comprising a scraper blade, a yoke medially disposed on one side thereof and having spaced sides, a block pivotally mounted between the sides of said yoke, and a handle having its inner end pivotally connected to the said block, the axis of the pivotal connection between the block and the sides of the yoke being at right-angles to that of the pivotal connection between the handle and block.

4. A hand-hole scraper comprising a scraper-blade, guides extending from one face of the scraper adjacent its ends, a handle pivoted to said face of the scraper and located between the guides, said scraper being formed with cutting edges on its opposite sides between the guides and the ends of said blade.

5. In a hand-hole scraper, a scraper blade provided adjacent its opposite ends with a pair of roller guides to bear on the side of the hand-hole and a handle connected to the blade and arranged between said roller guides.

In testimony whereof, we affix our signatures in presence of two witnesses.

HENRY B. COCKRELL.
HEYWARD B. MILLER.

Witnesses:
WILBUR H. ZEPP,
R. J. EARNSHAW.